United States Patent
Tain et al.

(10) Patent No.: US 8,418,456 B2
(45) Date of Patent: Apr. 16, 2013

(54) HEAT-PIPE ELECTRIC POWER GENERATING DEVICE AND HYDROGEN/OXYGEN GAS GENERATING APPARATUS AND INTERNAL COMBUSTION ENGINE SYSTEM HAVING THE SAME

(75) Inventors: Ra-Min Tain, Taipei County (TW); Wen-Yang Peng, Taipei County (TW); Yao-Shun Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 947 days.

(21) Appl. No.: 12/390,512

(22) Filed: Feb. 23, 2009

(65) Prior Publication Data
US 2010/0162969 A1 Jul. 1, 2010

(30) Foreign Application Priority Data
Dec. 25, 2008 (TW) ................ 97150762 A

(51) Int. Cl.
*F03C 1/00* (2006.01)
*F03B 13/00* (2006.01)
*F02B 43/08* (2006.01)

(52) U.S. Cl.
USPC .................. 60/531; 123/3; 290/43

(58) Field of Classification Search ........ 123/3; 60/531, 60/670; 219/629, 630
See application file for complete search history.

(56) References Cited

U.S. PATENT DOCUMENTS

| | | | | |
|---|---|---|---|---|
| 4,165,614 A * | 8/1979 | Yeh | | 60/531 |
| 4,186,559 A * | 2/1980 | Decker et al. | | 60/531 |
| 4,520,305 A * | 5/1985 | Cauchy | | 322/2 R |
| 4,740,711 A * | 4/1988 | Sato et al. | | 290/52 |
| 4,921,041 A * | 5/1990 | Akachi | | 165/104.29 |
| 6,011,334 A * | 1/2000 | Roland | | 310/86 |
| 6,209,626 B1 * | 4/2001 | Bhatia | | 165/104.25 |
| 6,330,907 B1 * | 12/2001 | Ogushi et al. | | 165/104.26 |
| 6,427,765 B1 * | 8/2002 | Han et al. | | 165/104.26 |
| 7,663,261 B2 * | 2/2010 | Miller et al. | | 290/54 |
| 7,705,482 B2 * | 4/2010 | Leininger | | 290/55 |
| 7,723,860 B2 * | 5/2010 | Nagler | | 290/54 |
| 7,812,470 B2 * | 10/2010 | Baarman et al. | | 290/43 |
| 7,900,437 B2 * | 3/2011 | Venkataramani et al. | | 60/267 |

(Continued)

FOREIGN PATENT DOCUMENTS

| | | |
|---|---|---|
| TW | I275757 | 3/2007 |
| TW | 200809085 | 2/2008 |
| TW | 200827553 | 7/2008 |
| WO | 2008068491 | 6/2008 |

*Primary Examiner* — Lindsay Low
*Assistant Examiner* — Tea Holbrook
(74) *Attorney, Agent, or Firm* — Jianq Chyun IP Office

(57) ABSTRACT

A heat-pipe electric power generating device including a fan disposed between an evaporating end and a condensing end of a heat-pipe is provided. A magnetic substance is disposed on the fan to form a magnetic field. A stator coil of a generator is disposed at the outer of the heat-pipe, which is corresponding to the position of the fan. An induced current is generated by the stator coil of the generator when the magnetic substance spins. Since the heat-pipe is made of copper, and the magnetic field is not shielded by copper, a current is induced when a relative motion between the magnetic substance on the fan and the stator coil of the generator at the outer of the heat-pipe is generated. Further, the heat-pipe electric power generating device can be applied on a hydrogen/oxygen gas generating apparatus and an internal combustion engine system of a motor vehicle.

17 Claims, 5 Drawing Sheets

U.S. PATENT DOCUMENTS

| | | | |
|---|---|---|---|
| 2003/0178184 A1* | 9/2003 | Kroliczek et al. | 165/104.26 |
| 2006/0222423 A1* | 10/2006 | Dejong et al. | 399/333 |
| 2006/0266043 A1* | 11/2006 | Jerome | 60/651 |
| 2007/0151709 A1* | 7/2007 | Touzov | 165/104.26 |
| 2007/0151969 A1* | 7/2007 | Tain et al. | 219/631 |
| 2007/0218706 A1* | 9/2007 | Matsuoka | 438/781 |
| 2008/0178589 A1* | 7/2008 | He et al. | 60/531 |
| 2008/0277094 A1* | 11/2008 | Peng et al. | 165/80.3 |
| 2010/0018677 A1* | 1/2010 | Leng | 165/104.26 |
| 2010/0162970 A1* | 7/2010 | Chen et al. | 123/3 |

\* cited by examiner

US 8,418,456 B2

HEAT-PIPE ELECTRIC POWER GENERATING DEVICE AND HYDROGEN/OXYGEN GAS GENERATING APPARATUS AND INTERNAL COMBUSTION ENGINE SYSTEM HAVING THE SAME

CROSS-REFERENCE TO RELATED APPLICATION

This application claims the priority benefit of Taiwan application serial no. 97150762, filed on Dec. 25, 2008. The entirety of the above-mentioned patent application is hereby incorporated by reference herein and made a part of specification.

BACKGROUND OF THE INVENTION

1. Field of the Invention

The present invention relates to a technique of converting heat energy and electrical energy. More particularly, the present invention relates to a heat-pipe electric power generating device, and the heat-pipe electric power generating device can be applied in a hydrogen/oxygen gas generating apparatus and an internal combustion engine system.

2. Description of Related Art

Energy is an indispensable commodity in our daily lives. Moreover, energy can exist in various forms and is commonly present as heat energy, electric energy, and light energy. From a perspective of energy, some heat energy or electric energy can actually produce some beneficial results. However, some other energy become waste energy due to reasons regarding conversion efficiency and will be exhausted to the surrounding instead of being used continually. For example, an electronic apparatus using electric energy to perform some functional operations, such that the electronic apparatus also generates heat to produce waste heat. The waste heat is usually dissipated to surrounding and not being utilized further. Moreover, if energy is present in forms of light energy or heat energy, but the energy demanded is electric energy, then an efficient converting apparatus or system will be required to perform the conversion.

The widely used traditional energy, such as petroleum, is gradually depleted. Therefore, the search for effective energy utilization and recycling is also one of the most important issues. Furthermore, other than the source-limited petroleum energy, the use of inexhaustible solar energy may also be considered. In addition, solar energy may also be converted into heat energy, electric energy, etc.

Therefore, how to convert waste heat into effective energy has always been one of the issues that need to be solved. Moreover, how to effectively convert heat energy into electric energy to perform all types of energy application is also a problem being considered by energy researchers.

In the T.W. patent publication 200809085, a heat-pipe electric power generating device has been disclosed. The heat-pipe electric power generating device disposes a magnet fixing rack on a rotary blade of a turbine to install the magnet, and disposes a pivoted portion on a base installed with the rotary blade of the turbine such that the pivoted portion aligns with a shaft of the rotary blade of the turbine. Also, an airflow passage is disposed on the base installed with the rotary blade of the turbine. The airflow passage is located behind the direction of which the rotary blade of the turbine spins along the vapor flow. Since the airflow passage is located behind the vapor flowing direction of the rotary blade of the turbine, the airflow passage only has the simple purpose of allowing the vapor to pass, and does not have the function of increasing the efficiency of spinning the turbine blade by vapor, thus can not increase the effect of power generation.

Moreover, the PCT publication WO2008/068491 A2 has disclosed an electric generator. Here, a heat-pipe used by the electric generator is assembled by clamping a non-metallic pipe between two halves of heat-pipes. The main purpose is to ensure the magnetic field will not be shielded by other metallic heat-pipes that are not made from copper. As the heat-pipe is assembled by clamping the non-metallic pipe between two halves of heat-pipes, slits may form at the seam of the two halves of heat-pipes and the non-metallic pipe, such that the interior of the heat-pipe can not reach the airtight state. Also, the electric generator embeds the coil in the non-metallic pipe, so the process of manufacturing the heat-pipe is more complicated and consequently increases the production cost.

SUMMARY OF THE INVENTION

The present invention provides a heat-pipe electric power generating device that can utilize heat effectively. For example, waste heat can be converted into electric energy so as to recycle waste heat, or directly converts heat into applicable electric energy.

The present invention further provides a hydrogen/oxygen gas generating apparatus having the heat-pipe electric power generating device. The apparatus directs the electric power generated by the aforementioned heat-pipe electric power generating device into a water container to electrolyze water to produce hydrogen and oxygen.

The present invention further provides an internal combustion engine system having the heat-pipe electric power generating device. The system generates electric power from the heat-pipe electric power generating device with waste heat from a motor vehicle, where the electric power is directly provided to the hydrogen/oxygen gas generating apparatus to produce hydrogen and oxygen. Afterward, the hydrogen and oxygen are mixed with air from the gas inlet of the engine of the motor vehicle and injected into the engine to ignite with oil gas to increase the working efficiency of the engine and decrease the volume of exhaust gas emission.

The present invention provides a heat-pipe electric power generating device, used to convert heat energy or heat into electric energy. The heat-pipe electric power generating device includes a heat-pipe, a magnetic field change generating apparatus, and a stator coil of a generator. The heat-pipe has a sealed internal chamber and generates an airflow from an evaporating end to a condensing end by the pressure difference between two ends of the heat-pipe. The magnetic field change generating apparatus is disposed within the internal chamber of the heat-pipe. Moreover, the magnetic field change generating apparatus includes at least a fan, a hollow case, a bearing, and an airflow passage. Furthermore, a permanent magnetic substance is disposed on the fan to form a magnetic field. The hollow case aligns with an inner wall of the heat-pipe. In addition, a first end of the hollow case contacts the evaporating end of the heat-pipe. Also, at least an opening is disposed on the hollow case so that the vapor generated at the inner wall of the heat-pipe can enter the hollow case through the opening. The bearing is disposed on a second end corresponds to the first end of the hollow case, and is used to install a shaft of the fan. The airflow passage directs the vapor inside the hollow case to the fan. The stator coil of the generator is disposed on a position corresponds to the fan at an outer of the heat-pipe.

The present invention provides a hydrogen/oxygen gas generating apparatus having the heat-pipe electric power generating device, which includes the heat-pipe electric power generating device, a container, and a set of positive and negative electrodes. The interior of the container contains an electrolytic solution and includes a gas outlet. The set of positive and negative electrodes is disposed within the electrolytic solution in the container. Herein, the set of positive and negative electrodes is electrically connected to power output ends of the stator coil of the generator of the heat-pipe electric power generating device.

The present invention provides an internal combustion engine system having the heat-pipe electric power generating device. The system includes the heat-pipe electric power generating device, the container, the set of positive and negative electrodes, and an internal combustion engine. The interior of the container contains an electrolytic solution and includes a gas outlet. The set of positive and negative electrodes is disposed within the electrolytic solution in the container. Herein, the set of positive and negative electrodes is electrically connected to power output ends of the stator coil of the generator of the heat-pipe electric power generating device. The internal combustion engine is connected to the gas outlet. The gas product directed from the gas outlet is used as a fuel for the internal combustion engine.

In the heat-pipe electric power generating device of the present invention, as the magnetic field change generating apparatus has the hollow case, one end of the hollow case is disposed with the airflow passage to direct the vapor generated inside the heat-pipe to the fan. Since the airflow passage is disposed in front of the direction of which the fan flows along the vapor flow, the efficiency of spinning the fan by the vapor can be increased. Moreover, as another end of the hollow case, which corresponds to the bearing, contacts with the evaporating end of the heat-pipe and forms at least an opening such that the vapor generated at the inner wall of the heat-pipe may enter the hollow case, and the remaining of the hollow case aligns with the inner wall of the heat-pipe, the vapor may be prevented from condensing and subsequently entering a capillary structure on the inner wall of the heat-pipe before reaching the fan.

In the heat-pipe electric power generating device of the present invention, as an integral heat-pipe has been used, slits will not form on the inner wall of the heat-pipe, and the interior of the heat-pipe can maintain an airtight state. Moreover, since the stator coil of the generator is disposed at the outer of the heat-pipe, the manufacturing process of the heat-pipe is simpler, thus the production cost can be reduced.

The hydrogen/oxygen gas generating apparatus having the heat-pipe electric power generating device of the present invention directs the electric power generated by the heat-pipe electric power generating device into a water container to electrolyze water to produce hydrogen and oxygen.

The internal combustion engine system having the heat-pipe electric power generating device of the present invention generates electric power from the heat-pipe electric power generating device with waste heat, where the electrical power is used to produce hydrogen and oxygen. Then, the hydrogen and oxygen produced are used as fuels and are directed to the internal combustion engine to increase the working efficiency of the internal combustion engine and decrease the volume of exhaust gas emission to achieve the efficacy of energy saving and carbon reduction.

To make the above and other features and advantages of the present invention more comprehensible, several embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In some traditional designs of heat apparatuses, a heat pipe is a conventional design. The present invention provides an advanced design after studying the traditional heat-pipe mechanism to obtain an ability to generate power. For illustration, some embodiments are described in the following. However, the present invention is not limited to the recited embodiments.

The heat-pipe electric power generating device of the present invention includes a heat-pipe, a magnetic field change generating apparatus, and a stator coil of a generator.

Figure 1A:
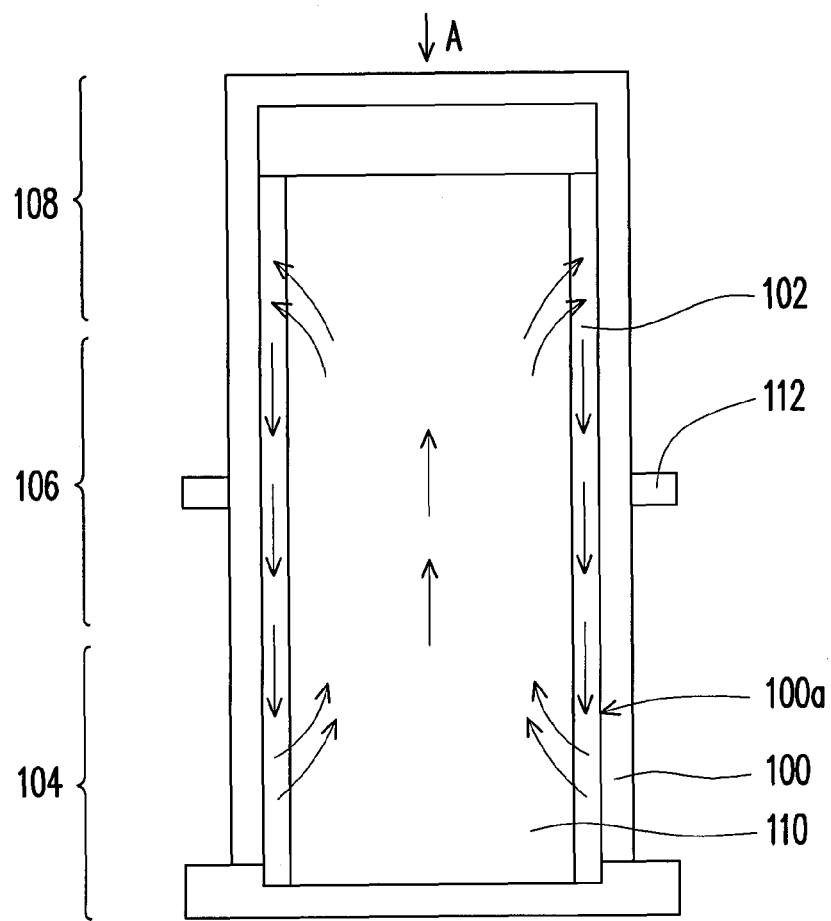
FIG. 1A shows a schematic cross-sectional view of a structure of a heat-pipe according to the present invention.
Figure 1B:
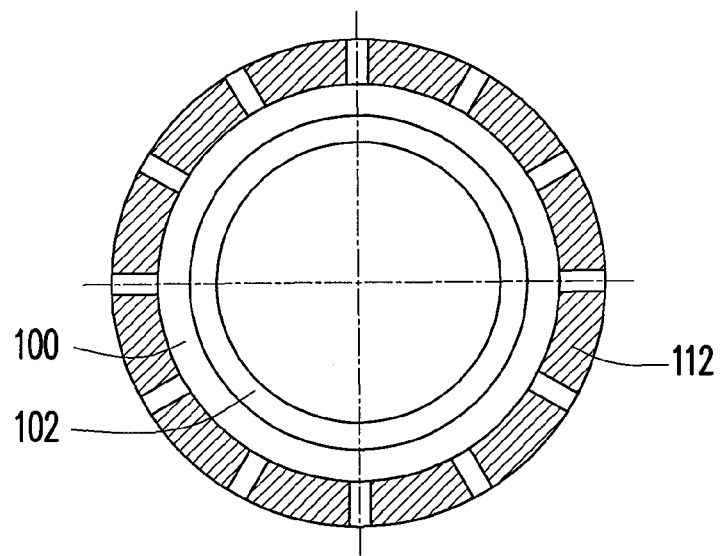
FIG. 1B shows a schematic top view along a direction of an arrow A in FIG. 1A.

FIG. 1A shows a schematic cross-sectional view of a structure of a heat-pipe according to the present invention. FIG. 1B shows a schematic top view along a direction of an arrow A in FIG. 1A.

Referring to FIG. 1A and FIG. 1B, a heat-pipe 100 forms a sealed chamber of a pipe-shape. A material of the heat-pipe 100 is, for example, copper. Moreover, an inner wall 100a of the heat-pipe 100 is disposed with a capillary structure 102. The capillary structure 102 is composed of a material with, for example, capillarity or liquid infiltrative property.

The sealed chamber of the heat-pipe 100 will be first filled with a thermal medium substance under low pressure. The thermal medium substance includes a fluid substance with low saturated evaporation pressure, for example, water or other fluid substances. According to latent heat variation characteristic between a gas phase and a liquid phase of the substance, the low saturated evaporation pressure lowers an evaporation temperature of the liquid and also condenses the substance to liquid easily. Moreover, heat energy is released for dissipation when the gas condenses, and heat energy is absorbed when the liquid evaporates. Thus, the heat-pipe 100 can be divided into three regions in general; an evaporating end 104, a middle region 106, and a condensing end 108. The filled substance will be condensed to liquid in the capillary structure 102 on the inner wall 100a of the heat-pipe 100. Through the capillarity of the capillary structure 102, the liquid will be directed to the evaporating end 104. After the evaporating end 104 has been heated, the evaporating end 104 will be in a high pressure surrounding with a relatively high temperature. At the evaporating end 104, the liquid is in a critical zone for latent change during the heating process, and will be evaporated to gas at a temperature above a critical temperature. Since the pressure of the gas phase is far greater than the pressure of the liquid phase, a big and powerful evaporation airflow will flow toward the condensing end 108 when a trace amount of liquid is evaporated into gas. Then, the airflow releases energy at the condensing end 108 and the liquid flows back to the evaporating end 104 to form a cycle route 110 as illustrated by arrows.

Figure 2A:
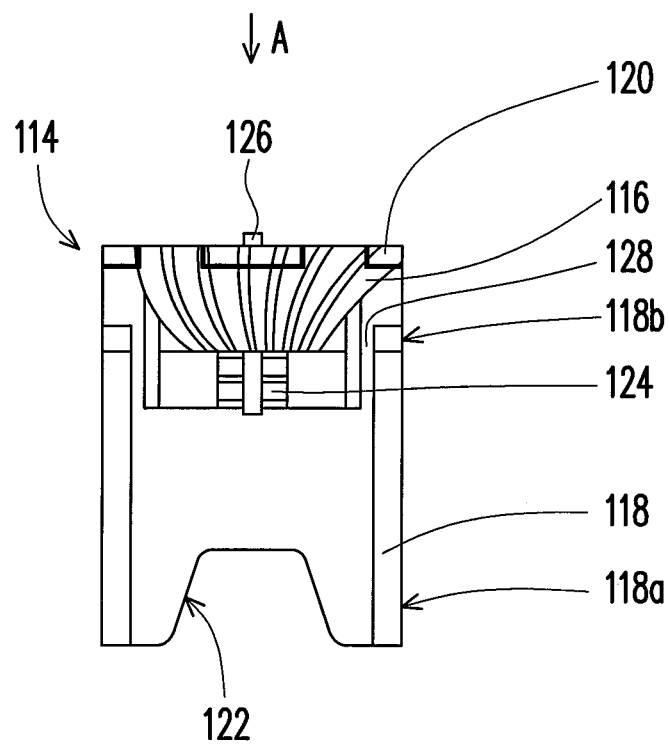
FIG. 2A shows a schematic cross-sectional view of a structure of a magnetic field change generating apparatus according to the present invention.
Figure 2B:
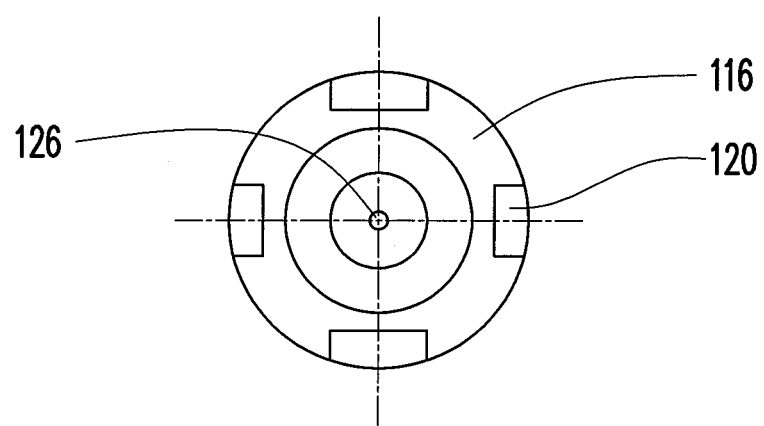
FIG. 2B shows a schematic top view along a direction of an arrow A in FIG. 2A.

FIG. 2A shows a schematic cross-sectional view of a structure of a magnetic field change generating apparatus according to the present invention. FIG. 2B shows a schematic top view along a direction of an arrow A in FIG. 2A.

Referring to FIG. 2A and FIG. 2B, a magnetic field change generating apparatus 114 includes at least a fan 116, a hollow case 118, and a permanent magnetic substance 120.

The fan 116 is, for example, a rotary blade of a turbine. The permanent magnetic substance 120 is disposed on the fan 116 and can produce a permanent magnetic field to generate power.

In addition, a first end 118a of the hollow case 118 is disposed with at least an opening 122 so that the vapor generated on the inner wall of the heat-pipe 100 can enter hollow case 118 through the opening 122.

Moreover, a second end 118b corresponding to the first end 118a of the hollow case 118 is disposed with a bearing 124 to install an shaft 126 of the fan 116 and an airflow passage 128 to direct the vapor inside the hollow case 118 to the fan 116. The airflow passage 128 is, for example, a nozzle that sprays the vapor to the fan 116 at a set pressure. The fan 116 spins by the propelling of vapor flow, and causes the permanent magnetic field to spin. Additionally, a material of the hollow case 118 is, for example, polytetrafluoroethylene (Teflon) or polyetheretherketone (engineering plastics, PEEK).

Figure 3A:
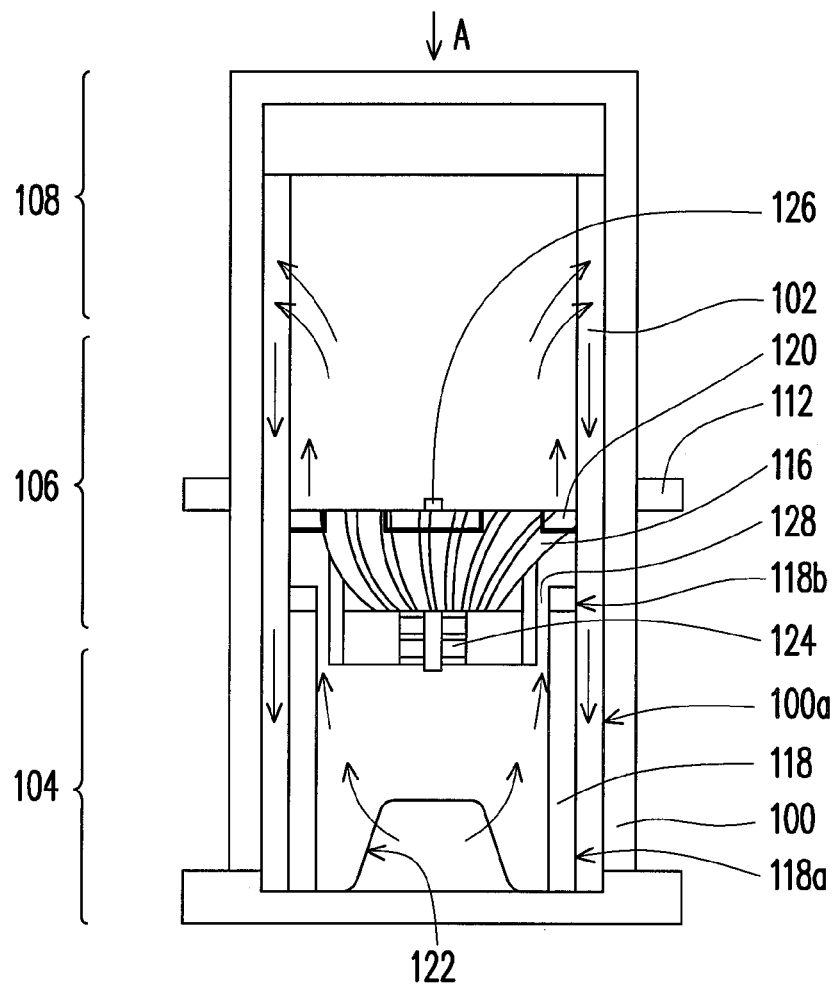
FIG. 3A shows a schematic cross-sectional view of a structure of a heat-pipe electric power generating device according to the present invention.
Figure 3B:
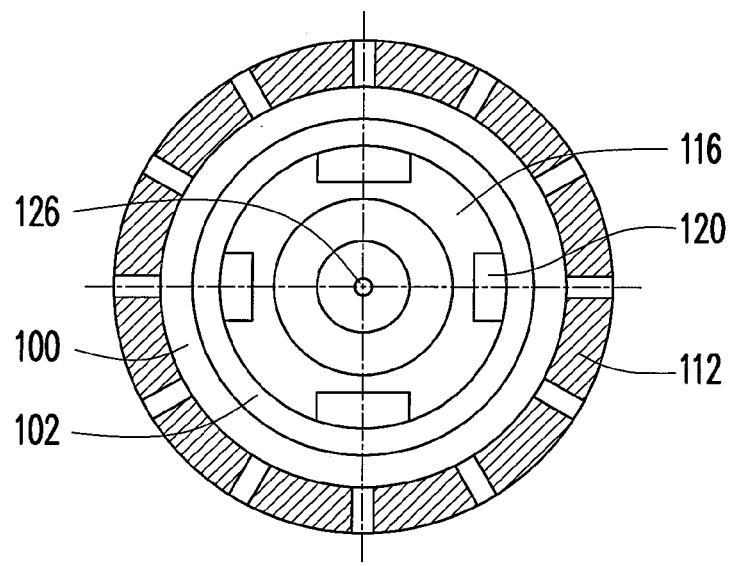
FIG. 3B shows a schematic top view along a direction of an arrow A in FIG. 3A.

FIG. 3A shows a schematic cross-sectional view of a structure of a heat-pipe electric power generating device according to the present invention. FIG. 3B shows a schematic top view along a direction of an arrow A in FIG. 3A. FIG. 3A is a schematic diagram of installing the magnetic field change generating apparatus 114 in FIG. 2A to the interior of the heat-pipe 100.

Referring to FIG. 3A and FIG. 3B, a stator coil of a generator 112 is disposed on a position that corresponds to the fan of the magnetic field change generating apparatus 114 at the outer of the heat-pipe 100. The stator coil of the generator 112 is, for example, a collecting ring.

The magnetic field change generating apparatus 114 is disposed in the interior of the heat-pipe 100. The first end 118a of the hollow case 118 contacts with the evaporating end 104 of the heat-pipe 100. Furthermore, the remaining portion of the hollow case 118 aligns with the heat-pipe 100 to prevent vapor from condensing and thus entering the capillary structure 102 on the inner wall of the heat-pipe 100 before reaching the fan 116. The vapor generated at the inner wall of the heat-pipe 100 can enter the hollow case 118 through the opening 122 disposed on the first end 118a of the hollow case 118.

The fan 116 of the magnetic field change generating apparatus 114 is disposed between the evaporating end 104 and the condensing end 108 of the heat-pipe 100. The permanent magnetic substance 120 disposed on the fan 116 forms a magnetic field. The fan 116 is spun by the propelling of the vapor flow, and causes the permanent magnetic field to spin, such that the permanent magnetic field and the stator coil of the generator 112 generate electric energy by physical laws. In other words, when the fan 116 is propelled by vapor to spin, a relative motion is generated between the permanent magnetic substance 120 on the fan 116 and the stator coil of the generator 112 at the outer of the heat-pipe 100. Hence, changes are generated in the magnetic field of the stator coil of the generator 112 and an electrical current is generated as a consequence. Moreover, the efficiency of power generation increases as the speed of the vapor increases.

However, the aforementioned manner is not the only disposition manner. All changes that are disposed based on the theory of electromagnetic power generation are permitted. For example, the permanent magnetic substance 120 can be fixed on the inner wall of the heat-pipe 100, and the coil can be disposed on the fan, so the coil spins using the aforementioned rotary mechanism to achieve the power generation.

The position of the fan 116 is not limited to the position at the middle point. In general, any position that can utilize the airflow would work. Also, the heat-pipe does not require a design of a straight pipe. Moreover, in the present embodiment, since the condensed liquid back flows easily due to gravity, the heat-pipe electric power generating device is disposed perpendicularly in operation, and the evaporating end 104 is disposed on the bottom to increase efficiency. However, the aforementioned disposition is not the only option. The heat-pipe electric power generating device can also be disposed horizontally.

Figure 4:
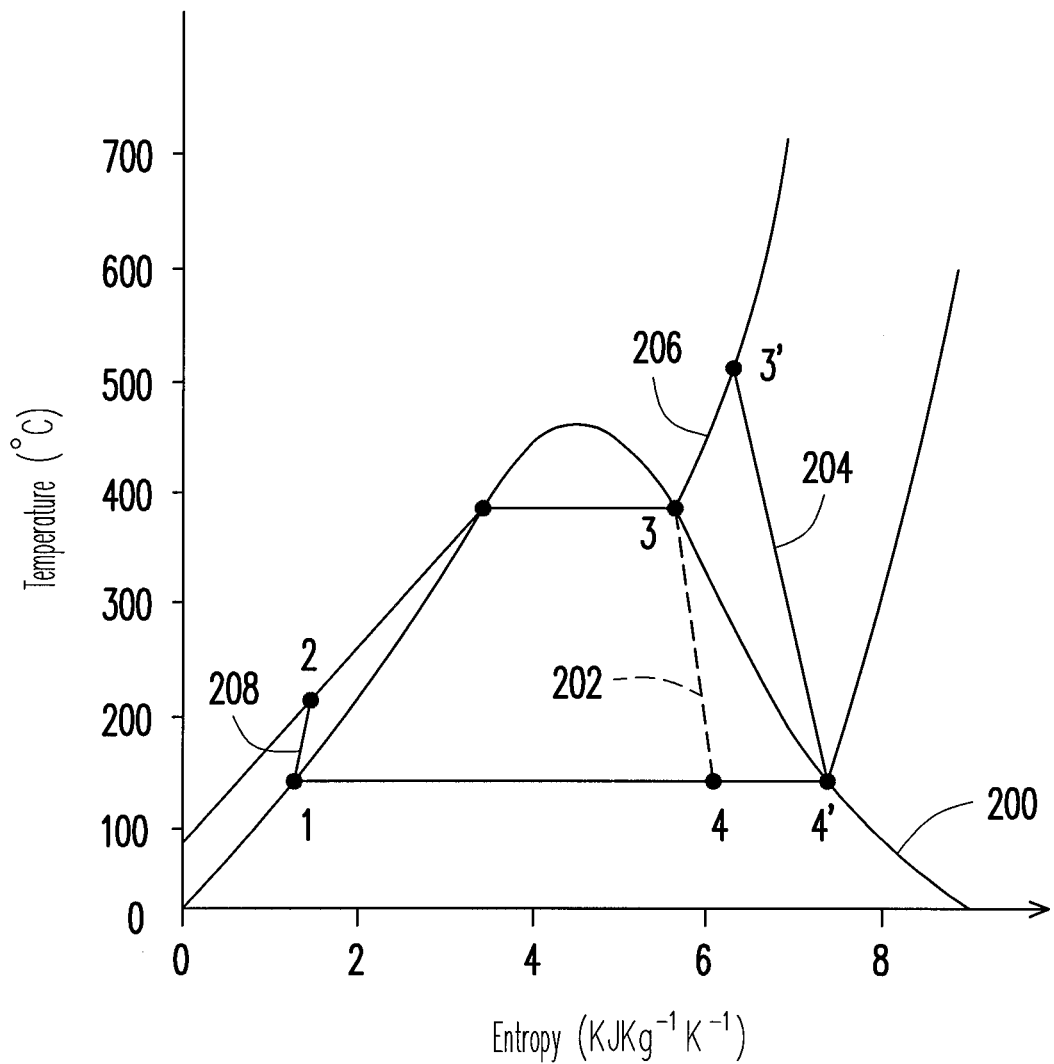
FIG. 4 shows a schematic view of the heat-pipe electric power generating device of the present invention corresponding to a traditional thermal work diagram.

In addition, based on the theory in thermodynamics, phase diagrams of the gas phase and the liquid phase are observed as illustrated in FIG. 4. FIG. 4 shows a schematic view of the heat-pipe electric power generating device of the present invention corresponding to a traditional thermal work diagram. In FIG. 4, the horizontal axis is the entropy (S) and the vertical axis is the temperature (T). Here, a cycle formed by points 1, 2, 3, and 4 is an ordinary cycle, and a cycle formed by points 1, 2, 3', and 4' is a superheat cycle. The top region of a saturated vapor curve 200 represents the high pressure, the region to the left of the peak represents the liquid phase, and the region to the right of the peak represents the gas phase. On the other hand, the bottom region of the saturated vapor curve 200 represents that the low pressure is a region mixed with the liquid phase and the gas phase. At this time, a route 208 from the point 1 to the point 2 has the characteristic of an isentropic compression. Moreover, a route 202 from the point 3 to the point 4 and a route 204 from the point 3' to the point 4' correspond to a portion of power generation by the turbine. That is, the route 202 from the point 3 to the point 4 means the turbine is driven by saturated vapor, and the route 204 from the point 3' to the point 4' means the turbine is driven by the vapor with high temperature and high pressure. Additionally, a region of 206 is the beneficial results produced by a heat evaporator. Finally, at the point 4, gas starts to condense and returns to the point 1. Here, the efficiency of power generation increases as the speed of the vapor increases.

In the heat-pipe electric power generating device of the present invention, as the magnetic field change generating apparatus 114 has a hollow case 118, the vapor generated on the inner wall of the heat-pipe 100 can enter the hollow case 118 through the opening 122 disposed on the first end 118a of the hollow case 118. Before the vapor passes through the airflow passage 128 and is directed to the fan, the vapor is concentrated in the interior of the hollow case 118, so that the vapor is directed to the fan 116 under a pressure higher than the saturated evaporation pressure. Thus, the speed of the vapor is increased. The heat-pipe electric power generating device of the present invention uses the vapor with high temperature and pressure to drive the fan, where the route 204 from the point 3' to the point 4' is followed when generating power.

Next, the operating principle of the heat-pipe electric power generating device of the present invention is illustrated.

Referring to FIG. 3A, the evaporating end 104 will be in a high pressure surrounding with relatively high temperature after being heated, and the liquid at the evaporating end 104 will be evaporated to gas, which then flows to the condensing end 108. Here, the vapor generated on the inner wall of the evaporating end 104 of the heat-pipe 100 enters the hollow case 118 through the opening 122 disposed on the first end 118a of the hollow case 118, and the vapor is concentrated in the interior of the hollow case 118. When the vapor passes through the airflow passage 128, the vapor is directed to the fan 116 under the pressure that is higher than the saturated evaporation pressure. Thus, the speed of the vapor is increased. Moreover, the fan 116 spins when the vapor passes through the fan 116, such that a relative motion is generated between the permanent magnetic substance 120 on the fan 116 and the stator coil of the generator 112 at the outer of the heat-pipe 100. As a consequence, changes in the magnetic field of the stator coil of the generator 112 are produced and the electrical current is generated. The vapor passes through the fan 116 and reaches the condensing end 108 of the heat-pipe 100. The vapor condenses to water drops on the inner wall of the heat-pipe 100, and the water drops are returned to the evaporating end 104 through the capillary structure 102 on the inner wall to be evaporated again. The cycle is repeated to achieve the goals of dissipation and power generation.

In the heat-pipe electric power generating device of the present invention, as the portion of the hollow case 118 excluding the opening 122 is aligned with the heat-pipe 100, the vapor is prevented from condensing and entering the capillary structure 102 on the inner wall of the heat-pipe 100 before reaching the fan 116. Consequently, the efficiency of the heat-pipe electric power generating device is increased.

In the heat-pipe electric power generating device of the present invention, as the material of the heat-pipe 100 is copper, and copper does not shield the magnetic field, so when there is the relative motion between the fan 116 and the stator coil of the generator 112, a magnetic field change will result to generate the electric current.

In the heat-pipe electric power generating device of the present invention, as the airflow passage 128 is located in front of a direction of which the fan spins along the vapor flow, when the vapor passes through the airflow passage 128, the vapor is directed to the fan 116 under the pressure greater than the saturated evaporation pressure. Consequently, the speed of the vapor is increased to increase the efficiency of power generation.

In the heat-pipe electric power generating device of the present invention, as an integral heat-pipe 100 has been used, slits will not form on the inner wall, and the interior of the heat-pipe 100 can maintain the airtight state. Moreover, since the stator coil of the generator 112 is disposed at the outer of the heat-pipe 100, the manufacturing process of the heat-pipe 100 is simpler, thus the production cost can be reduced.

Figure 5:
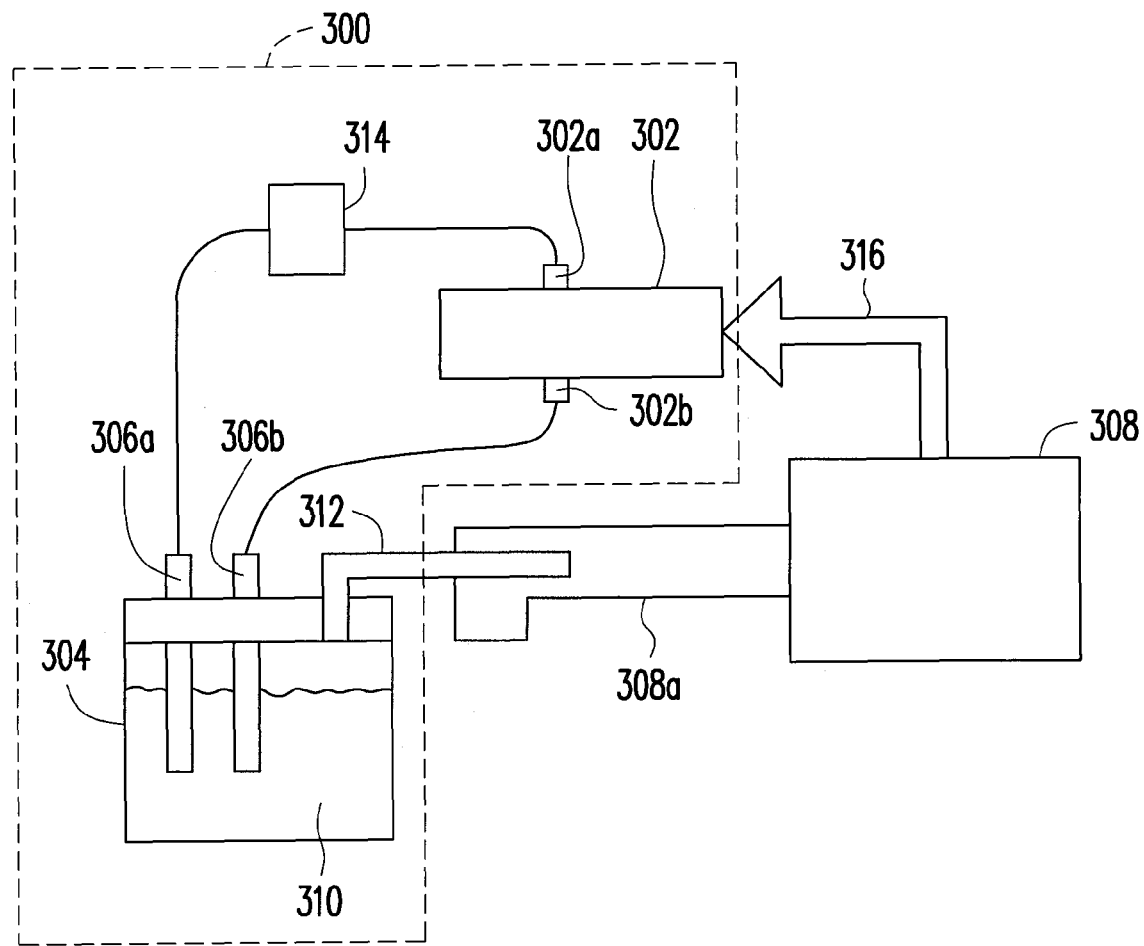
FIG. 5 shows an internal combustion engine system having the heat-pipe electric power generating device of the present invention.

The heat-pipe electric power generating device of the present invention can be used in a hydrogen/oxygen gas generating apparatus, and further integrates with an internal combustion engine system. The internal combustion engine system having the heat-pipe electric power generating device will be illustrated in the following. FIG. 5 shows an internal combustion engine system having the heat-pipe electric power generating device of the present invention.

Referring to FIG. 5, the internal combustion engine system having the heat-pipe electric power generating device is, for example, assembled by a heat-pipe electric power generating device 302, a container 304, a set of positive and negative electrodes 306a and 306b, and an internal combustion engine 308. The heat-pipe electric power generating device 302, the container 304, the set of positive and negative electrodes 306a and 306b compose a hydrogen/oxygen gas generating apparatus 300.

The structure of the heat-pipe electric power generating device 302 is described above, and is thus not repeated herein.

The interior of the container 304 contains an electrolytic solution 310 and includes a gas outlet 312. The electrolytic solution 310 is electrolyzed water, for example.

The set of positive and negative electrodes 306a and 306b is disposed within the electrolytic solution 310 in the container 304. Herein, the set of positive and negative electrodes 306a and 306b is electrically connected to power output ends 302a and 302b of the stator coil of the generator of the heat-pipe electric power generating device 302.

The internal combustion engine 308 is connected to the gas outlet 312. The gas product directed from the gas outlet 312 is used as a fuel for the internal combustion engine 308. The internal combustion engine 308 includes an air inlet 308a, for instance. The air inlet 308a of the internal combustion engine 308 is connected to the gas outlet 312 of the hydrogen/oxygen gas generating apparatus 300. Therefore, the gas product (hydrogen, oxygen) of the hydrogen/oxygen gas generating apparatus 300 is mixed with air and directed into the internal combustion engine 308 so as to increase the ignition efficiency of the internal combustion engine 308 and reduce air pollution. After the operation of the internal combustion engine 308, the heat generated by the internal combustion engine 308 can be transmitted to the evaporating end of the heat-pipe through a heat conducting component 316 connected between the heat-pipe electric power generating device 302 and the internal combustion engine 308. The heat-conducting component 316 can be a radiator used to cool the internal combustion engine 308.

Moreover, the stator coil of the generator is disposed with a rectification apparatus 314, so that an alternating current generated by the stator coil of the generator can be converted to a direct current.

Next, the operating principle of the internal combustion engine system of the heat-pipe electric power generating device of the present invention is illustrated.

Firstly, a fuel tank (not shown) supplies fuels to the internal combustion engine 308, so that the internal combustion engine 308 can operate to generate kinetic energy and heat energy. Herein, the heat energy is transmitted to the evaporating end of the heat-pipe of the heat-pipe electric power generating device 302 to drive the heat-pipe electric power generating device 302. The heat-pipe electric power generating device 302 operates to generate electrical energy. The electrical energy is provided to the set of positive and negative electrodes 306a and 306b, and electrolyzes the electrolytic solution in the electrolytic container 304 to generate the gas product (hydrogen, oxygen). The gas product (hydrogen, oxygen) is directed from the gas outlet 312 and mixed with air to be directed into the internal combustion engine 308 to increase the ignition efficiency of the internal combustion engine 308 and reduce air pollution.

The hydrogen/oxygen gas generating apparatus having the heat-pipe electric power generating device of the present invention directs the electric power generated by the heat-pipe electric power generating device 302 into the container 304 to electrolyze water to generate hydrogen and oxygen.

In the internal combustion engine system having the heat-pipe electric power generating device 302 of the present invention, waste heat is used by the heat-pipe electric power generating device 302 to generate electric power, which is directly supplied to the hydrogen/oxygen gas generating apparatus to produce hydrogen and oxygen. Next, the hydrogen and oxygen produced are mixed with air from the air inlet and injected to the internal combustion engine to ignite with oil gas, such that the working efficiency of the internal combustion engine is increased and the volume of exhaust gas emission is decreased. In other words, the internal combustion engine system of the present invention can convert waste heat into electric energy, which is used to produce hydrogen and oxygen. The hydrogen and oxygen generated can be used as fuels and are directed into the internal combustion engine to thereby achieve the efficacy of energy saving and carbon reduction.

In the aforementioned embodiment, the heat-pipe electric power generating device of the present invention is integrated with the internal combustion engine system, for instance. The heat-pipe electric power generating device of the present invention can also be disposed on any apparatus that generates heat energy. Hence, an apparatus with heat recycling function can be assembled. For example, the thermal power generating apparatus can be integrated with the motor mobile exhaust gas emission system, or the thermal power generating apparatus can be disposed in the computer system. Therefore, besides from dissipation, the heat energy can also be recycled. Furthermore, in another example, an air conditioner is also an apparatus that generates a lot of waste heat. Thus, the present invention can be integrated into the air conditioner to recycle the waste heat. Similar applications as such will not be listed here.

The novel heat-pipe electric power generating device provided in the present invention simply utilizes the heat-pipe to recycle heat energy or actively convert heat energy into electric energy.

On the contrary, the heat-pipe electric power generating device and the application thereof in the present invention also provide another option for energy processing in an overall consideration.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A heat-pipe electric power generating device, suitable for converting a heat energy or a heat source energy into an electrical energy, comprising:
    a heat-pipe, having a sealed internal chamber, and generating an airflow from an evaporating end to a condensing end due to a pressure difference between two ends of the heat-pipe, wherein an inner wall of the heat-pipe is disposed with a capillary structure;
    a magnetic field change generating device, disposed within the internal chamber of the heat-pipe, comprising:
        at least a fan, wherein a permanent magnetic substance is disposed on the fan to generate a magnetic field;
        a hollow case, aligned with an inner wall of the heat-pipe, wherein the hollow case is disposed at the evaporating end of the heat-pipe entire outer wall of the hollow case contacts with the capillary structure, and at least an opening is disposed at the sidewall of the first end of the hollow case so that a vapor generated at the inner wall of the heat-pipe enters the hollow case through the opening;
        a bearing, disposed on a second end corresponding to the first end of the hollow case to install a shaft of the fan;
        at least an airflow passage, directing the vapor inside the hollow case to the fan; and
    a stator coil of a generator, disposed on a position corresponding to the fan at an outer of the heat-pipe.

2. The heat-pipe electric power generating device as claimed in claim 1, wherein a material of the heat-pipe is copper.

3. The heat-pipe electric power generating device as claimed in claim 1, wherein a material of the hollow case is polytetrafluoroethylene or polyetheretherketone.

4. The heat-pipe electric power generating device as claimed in claim 1, wherein a movement manner of the fan is a rotary or a back and forth movement.

5. A hydrogen/oxygen gas generating apparatus having the heat-pipe electric power generating device, comprising:
    a heat-pipe electric power generating device as claimed in claim 1;
    a container, containing an electrolytic solution and having a gas outlet; and
    a set of positive and negative electrodes, disposed within the electrolytic solution in the container, wherein the set of positive and negative electrodes and a power output end of a stator coil of a generator of the heat-pipe electric power generating device are electrically connected.

6. The hydrogen/oxygen gas generating apparatus having the heat-pipe electric power generating device as claimed in claim 5, wherein the stator coil of the generator is disposed with a rectification apparatus, so that an alternating current generated by the stator coil of the generator is converted to a direct current.

7. The hydrogen/oxygen gas generating apparatus having the heat-pipe electric power generating device as claimed in claim 5, wherein the electrolytic solution is electrolyzed water.

8. The hydrogen/oxygen gas generating apparatus having the heat-pipe electric power generating device as claimed in claim 5, wherein a material of the heat-pipe is copper.

9. The hydrogen/oxygen gas generating apparatus having the heat-pipe electric power generating device as claimed in claim 5, wherein a material of the hollow case is polytetrafluoroethylene or polyetheretherketone.

10. An internal combustion engine system having the heat-pipe electric power generating device, comprising:
    a heat-pipe electric power generating device as claimed in claim 1;
    a container, containing an electrolytic solution and having a gas outlet;
    a set of positive and negative electrodes, disposed within the electrolytic solution in the container, wherein the set of positive and negative electrodes and an power output end of a stator coil of a generator of the heat-pipe electric power generating device are electrically connected; and
    an internal combustion engine, connected to the gas outlet, wherein a gas product directed from the gas outlet is used as a fuel of the internal combustion engine.

11. The internal combustion engine system having the heat-pipe electric power generating device as claimed in claim 10, further comprising a heat-conductive component, connected to the heat-pipe electric power generating device and the internal combustion engine to transmit a heat generated by the internal combustion engine to the evaporating end of the heat-pipe.

12. The internal combustion engine system having the heat-pipe electric power generating device as claimed in claim 11, wherein the heat-conductive component is a radiator used to cool the internal combustion engine.

13. The internal combustion engine system having the heat-pipe electric power generating device as claimed in claim 10, wherein the stator coil of the generator is disposed with a rectification apparatus, so that an alternating current generated by the stator coil of the generator is converted to a direct current.

14. The internal combustion engine system having the heat-pipe electric power generating device as claimed in claim 10, wherein the electrolytic solution is electrolyzed water.

15. The internal combustion engine system having the heat-pipe electric power generating device as claimed in claim 10, wherein the internal combustion engine has an air inlet connected to the gas outlet.

16. The internal combustion engine system having the heat-pipe electric power generating device as claimed in claim 10, wherein a material of the heat-pipe is copper.

17. The internal combustion engine system having the heat-pipe electric power generating device as claimed in claim 10, wherein a material of the hollow case is polytetrafluoroethylene or polytetrafluoroethylene.

\* \* \* \* \*